Mar. 27, 1923. 1,449,966.
W. F. BAILEY.
COFFEEPOT.
FILED FEB. 16, 1922.
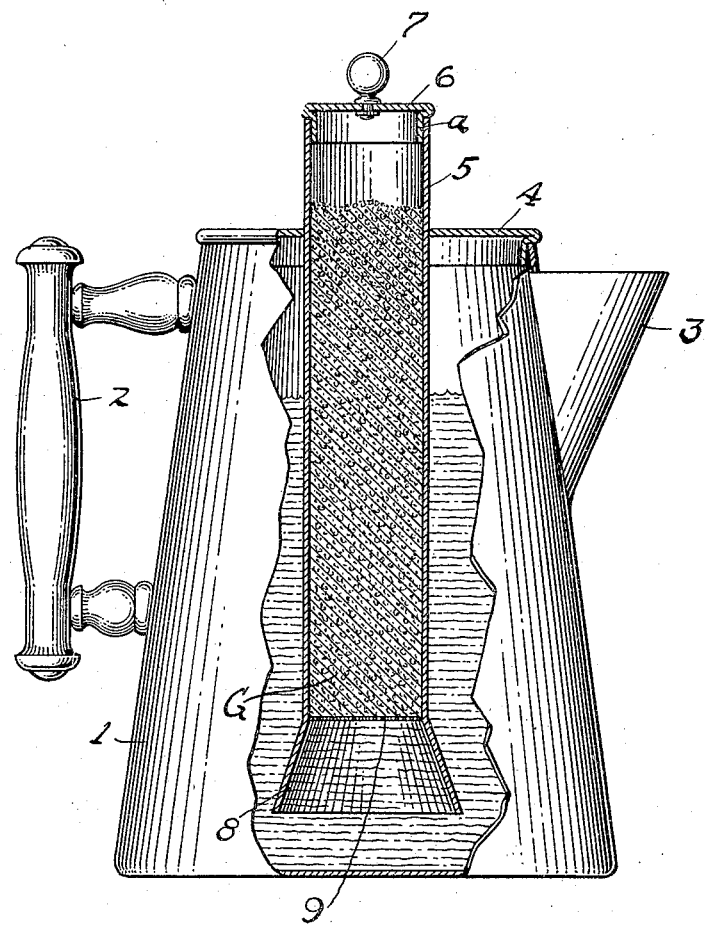
Willis F. Bailey INVENTOR.
BY
Harry A. Benner ATTORNEY.

Patented Mar. 27, 1923.

1,449,966

UNITED STATES PATENT OFFICE.

WILLIS F. BAILEY, OF DECATUR, ILLINOIS.

COFFEEPOT.

Application filed February 16, 1922. Serial No. 536,970.

*To all whom it may concern:*

Be it known that I, WILLIS F. BAILEY, a citizen of the United States, residing at Decatur, county of Macon, State of Illinois, have invented certain new and useful Improvements in Coffeepots, of which the following is a specification.

My invention has relation to improvements in coffee pots, or boilers, and consists in the novel features of construction more fully set forth in the specification and pointed out in the claim.

The object of the present invention is to provide a coffee boiler from which the liquid will not boil out; one in which the coffee grounds are confined in a tube through which the liquid will circulate and extract the essence from the grounds; one in which the grounds are subjected to the action of steam generated within the boiler; and one that is simple, consisting of comparatively few parts, easily accessible for cleaning purposes.

Further and other advantages will be better apparent from a detailed description of the invention in connection with the accompanying drawing representing a side elevation of my improved coffee pot with part of the wall broken away to show the central tube in longitudinal section.

Referring to the drawing, 1 represents the coffee pot or vessel provided with the usual handle 2 and discharge spout 3 opposite thereto. The open top of the pot 1 is adapted to be closed by a lid 4 with which is integrally formed an axially disposed tube 5 or container for the coffee grounds G. The tube 5 projects a substantial distance above the lid 4 and is adapted to be closed by a cover 6 which has a flange *a* that fits tightly within the top of the tube 5. A knob 7 is secured to the cover 6 so that the cover may be readily placed on the tube or removed. The lower end of the tube 5 is provided with a bell-shaped mouth 8 which extends downwardly to within a short distance of the bottom of the pot 1, and a perforated screen or porous bottom 9 is fixed into the tube just above the mouth 8 for the support of the charge of grounds G.

In the operation of my invention the tube 5 is charged with grounds to a level somewhat above that of the water that is charged into the pot, the tube, however, never being filled entirely full as a space should be left in the tube above the grounds for the accumulation of steam during the boiling of the liquid. For this reason the tube 5 is extended above the lid 4 so that it will accommodate sufficient grounds for a full pot of coffee. After the pot is charged with grounds and water it is placed over a flame as usual and a large volume of the heated water will rise into the mouth 8 of the tube (the original water level obviously being the same in the tube as outside it) and rise upward through the charge G. Owing to the fact that the tube 5 is closed at the top the circulation of the heated liquid will be both upward and downward through the grounds, and, after the temperature of the liquid has reached the boiling point, steam will accumulate in the space above the charge G to be forced downwardly through the charge as the pressure increases. The pressure within the tube is relieved through the porous bottom, after which the steam escapes through the spout 3.

It is readily apparent that this circulation of hot water and steam through the charge of grounds will extract practically all the coffee value from the charge in a comparatively short time, the value thus extracted being given up to the main body of liquid within the pot.

By virtue of my invention not only is coffee of any desired strength made in a comparatively short time, but by circulating the liquid through the grounds at a high temperature a great saving in coffee is accomplished.

When desired, the pot 1 may be easily cleaned, containing no inaccessible parts, as may the tube 5 also by simply removing the cover 6 and pouring boiling water through the tube.

Having described my invention, I claim:

A coffee boiler comprising a pot, a lid therefor, a tube formed integrally with said lid and adapted to be disposed within the pot when the lid is in place, the top of said tube extending a substantial distance above said lid and being provided with a removable cover, a porous bottom within the tube for the support of a charge of grounds, said tube being provided with a bell-shaped mouth below said porous bottom, and a discharge spout on said pot.

In testimony whereof I hereunto affix my signature.

WILLIS F. BAILEY.